United States Patent
Samie et al.

(10) Patent No.: US 10,054,201 B2
(45) Date of Patent: Aug. 21, 2018

(54) VARIABLE SPEED ACCESSORY DRIVE

(71) Applicant: GM GLOBAL TECHNOLOGY OPERATIONS LLC, Detroit, MI (US)

(72) Inventors: Farzad Samie, Franklin, MI (US); Derek F. Lahr, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 231 days.

(21) Appl. No.: 15/065,158

(22) Filed: Mar. 9, 2016

(65) Prior Publication Data

US 2016/0265634 A1 Sep. 15, 2016

Related U.S. Application Data

(60) Provisional application No. 62/132,070, filed on Mar. 12, 2015.

(51) Int. Cl.
| | |
|---|---|
| *F16H 9/10* | (2006.01) |
| *F16H 55/54* | (2006.01) |
| *B60K 25/02* | (2006.01) |

(52) U.S. Cl.
CPC ............. *F16H 9/10* (2013.01); *B60K 25/02* (2013.01); *F16H 55/54* (2013.01); *B60K 2025/022* (2013.01)

(58) Field of Classification Search
CPC . F16H 55/54; F16H 9/10; B62M 9/08; B60W 10/06; F02B 2275/06
USPC ......................................................... 474/56
See application file for complete search history.

(56) References Cited

U.S. PATENT DOCUMENTS

| | | | | |
|---|---|---|---|---|
| 78,763 | A * | 6/1868 | Savery | F16H 55/54 474/56 |
| RE4,685 | E * | 12/1871 | Savery | 474/56 |
| 370,087 | A * | 9/1887 | Riley | F16H 55/54 474/56 |
| 414,324 | A * | 11/1889 | Patric | F16H 55/54 474/56 |
| 414,508 | A * | 11/1889 | Finlay | F16H 55/54 474/56 |
| 593,895 | A * | 11/1897 | Jasper | F16H 55/54 474/53 |
| 598,654 | A * | 2/1898 | Cleland | F16H 55/54 474/56 |
| 652,092 | A * | 6/1900 | Desprez et al. | F16H 55/54 474/56 |

(Continued)

*Primary Examiner* — Henry Y Liu
(74) *Attorney, Agent, or Firm* — Quinn IP Law

(57) ABSTRACT

A variable speed drive mechanism includes a fixed disk concentric with, attached to, and rotatable with a shaft about a central axis. A plurality of pulley segments are supported by the fixed disk, and are moveable relative to the fixed disk in a radial direction relative to the central axis. A moveable disk is concentric with the shaft, and is rotatably moveable about the shaft relative to the fixed disk. The moveable disk defines a spiral groove having a center concentric with the shaft. The pulley segments include a guided groove portion engaged with and moveable along the spiral groove. Rotation of the moveable disk relative to the fixed disk rotates the spiral groove about the central axis relative to the pulley segments, thereby moving the guided groove portions along the spiral groove to move the pulley segments radially relative to the central axis.

20 Claims, 7 Drawing Sheets

(56) References Cited

U.S. PATENT DOCUMENTS

| | | | | |
|---|---|---|---|---|
| 672,962 A * | 4/1901 | Seymour | F16H 9/10 | 474/53 |
| 712,985 A * | 11/1902 | Wansbrough | F16H 55/54 | 474/56 |
| 724,449 A * | 4/1903 | Dumaresq | F16H 9/10 | 474/53 |
| 724,450 A * | 4/1903 | Dumaresq | F16H 9/10 | 474/53 |
| 740,829 A * | 10/1903 | Dumaresq | F16H 9/10 | 474/53 |
| 758,474 A * | 4/1904 | Reed | F16H 55/54 | 474/52 |
| 809,169 A * | 1/1906 | Brennan | F16H 55/54 | 474/56 |
| 809,845 A * | 1/1906 | Rosewarne | F16H 9/10 | 474/53 |
| 849,750 A * | 4/1907 | Rosewarne | F16H 9/10 | 474/53 |
| 858,754 A * | 7/1907 | Reed | F16H 55/54 | 474/56 |
| 914,860 A * | 3/1909 | Morrow | F16H 55/54 | 474/56 |
| 977,403 A * | 11/1910 | Rosewarne | F16H 9/10 | 474/53 |
| 1,132,125 A * | 3/1915 | Savery | F16H 55/54 | 474/53 |
| 1,545,658 A * | 7/1925 | Howe | F16H 55/54 | 474/54 |
| 3,661,024 A * | 5/1972 | Cooke | F16H 55/54 | 474/56 |
| 3,850,044 A * | 11/1974 | Hagen | B62M 9/08 | 474/56 |
| 3,850,045 A * | 11/1974 | Hagen | B62M 9/08 | 474/56 |
| 3,867,851 A * | 2/1975 | Gregory | B62M 9/08 | 474/163 |
| 3,956,944 A * | 5/1976 | Tompkins | B62M 9/08 | 474/50 |
| 3,995,508 A * | 12/1976 | Newell | B62M 9/08 | 474/50 |
| 4,147,068 A * | 4/1979 | Woollard | F16H 61/66245 | 474/13 |
| 4,295,836 A * | 10/1981 | Kumm | F16H 61/66227 | 474/51 |
| 4,569,670 A * | 2/1986 | McIntosh | F02B 67/06 | 474/16 |
| 4,608,034 A * | 8/1986 | Reswick | F16H 55/54 | 474/49 |
| 4,645,475 A * | 2/1987 | Husted | B62M 9/08 | 474/164 |
| 4,714,452 A * | 12/1987 | Kumm | F16H 55/54 | 474/49 |
| 4,717,369 A * | 1/1988 | Husted | B62M 9/08 | 474/49 |
| 4,781,663 A * | 11/1988 | Reswick | F16H 9/10 | 474/49 |
| 4,787,879 A * | 11/1988 | Pritchard | B62M 9/08 | 474/49 |
| 4,810,234 A * | 3/1989 | Kumm | F16H 9/10 | 474/49 |
| 4,824,419 A * | 4/1989 | Kumm | F16H 9/10 | 474/49 |
| 4,854,921 A * | 8/1989 | Kumm | F16H 55/54 | 474/138 |
| 4,875,894 A * | 10/1989 | Clark | F16H 9/10 | 474/49 |
| 4,938,732 A * | 7/1990 | Krude | F02B 67/06 | 474/53 |
| 4,969,857 A * | 11/1990 | Kumm | F16H 61/6624 | 474/49 |
| 2007/0163818 A1* | 7/2007 | Usoro | B60K 6/48 | 180/65.25 |
| 2014/0235404 A1* | 8/2014 | Raasch | F02D 29/06 | 477/44 |

* cited by examiner

VARIABLE SPEED ACCESSORY DRIVE

CROSS-REFERENCE TO RELATED APPLICATIONS

This application claims the benefit of U.S. Provisional Patent Application Ser. No. 62/132,070, filed on Mar. 12, 2015, the disclosure of which is hereby incorporated by reference.

TECHNICAL FIELD

The disclosure generally relates to a variable speed drive mechanism for an engine of a vehicle.

BACKGROUND

Vehicle engines typically include a drive pulley attached to a crankshaft, and at least one accessory having an accessory pulley. The accessory may include, for example, an Air Conditioning compressor, a power steering pump, an alternator, an air pump, or some other device that is driven by a rotational input. An endless rotatable device, e.g., a serpentine belt, connects the drive pulley with accessory pulleys. The drive pulley rotates the endless rotatable device. The endless rotatable device in turn rotates the accessory pulleys to power the accessory devices. Accordingly, the endless rotatable device transmits rotation from the drive pulley to the accessory pulleys to drive the accessories. As the rotational speed of the crankshaft increases, the rotational speed of the drive pulley increases, because the drive pulley is directly connected to the crankshaft. Many of the accessories are designed for optimal operation when the engine is operating at an idling speed. Operating the accessories at higher rotational speeds increases energy losses associated with the accessories.

SUMMARY

A variable speed drive mechanism is provided. The variable speed drive mechanism includes a shaft that extends along a central axis. A fixed disk is concentric with and attached to the shaft. The fixed disk is rotatable with the shaft about the central axis. A plurality of pulley segments are supported by the fixed disk, and are moveable relative to the fixed disk in a radial direction relative to the central axis. A moveable disk is concentric with the shaft, and is rotatably moveable about the shaft relative to the fixed disk. The moveable disk defines a spiral groove having a center concentric with the shaft on the central axis. Each of the plurality of pulley segments includes a guided groove portion that is engaged with and moveable along the spiral groove, such that rotation of the moveable disk about the shaft and relative to the fixed disk rotates the spiral groove about the central axis relative to the plurality of pulley segments, thereby moving the guided groove portion of each of the plurality of pulley segments along the spiral groove to move each of the plurality of pulley segments radially relative to the central axis.

An engine for a vehicle is also provided. The engine includes an accessory device having an accessory pulley. The engine further includes a crankshaft, and a variable speed drive mechanism coupled to the crankshaft. An endless rotatable device interconnects the variable speed drive mechanism and the accessory pulley of the accessory device. The endless rotatable device is operable to transmit rotation between the variable speed drive mechanism and the accessory pulley. An adjustable tensioner biases against the endless rotatable device, and is operable to maintain a constant tension in the endless rotatable device. The variable speed drive mechanism includes a shaft that is coupled to the crankshaft for rotation with the crankshaft about a central axis. A fixed disk is concentric with and attached to the shaft. The fixed disk is rotatable with the shaft about the central axis. A plurality of pulley segments are supported by the fixed disk, and are moveable relative to the fixed disk in a radial direction relative to the central axis. A moveable disk is concentric with the shaft, and is rotatably moveable about the shaft relative to the fixed disk. The moveable disk defines a spiral groove having a center concentric with the shaft on the central axis. Each of the plurality of pulley segments includes a guided groove portion engaged with and moveable along the spiral groove. Rotation of the moveable disk about the shaft and relative to the fixed disk rotates the spiral groove about the central axis relative to the plurality of pulley segments, thereby moving the guided groove portion of each of the plurality of pulley segments along the spiral groove to move each of the plurality of pulley segments radially relative to the central axis. A drive actuator is coupled to the moveable disk. The drive actuator is operable to rotate the moveable disk relative to the fixed disk.

A continuously variable transmission is also provided. The continuously variable transmission includes a variable drive mechanism and a variable driven mechanism. An endless rotatable device interconnects the variable drive mechanism and the variable driven mechanism. The endless rotatable device is operable to transmit torque from the variable drive mechanism to the variable driven mechanism. Each of the variable drive mechanism and the variable driven mechanism include a shaft extending along a central axis, and a fixed disk concentric with and attached to the shaft. The fixed disk is rotatable with the shaft about the central axis. A plurality of pulley segments are supported by the fixed disk, and are moveable relative to the fixed disk in a radial direction relative to the central axis. A moveable disk is concentric with the shaft, and is rotatably moveable about the shaft relative to the fixed disk. The moveable disk defines a spiral groove having a center concentric with the shaft on the central axis. A drive actuator is coupled to the moveable disk, and is operable to rotate the moveable disk relative to the fixed disk. Each of the plurality of pulley segments includes a guided groove portion engaged with and moveable along the spiral groove. Rotation of the moveable disk about the shaft and relative to the fixed disk rotates the spiral groove about the central axis relative to the plurality of pulley segments, thereby moving the guided groove portion of each of the plurality of pulley segments along the spiral groove to move each of the plurality of pulley segments radially relative to the central axis.

Accordingly, the variable drive mechanism is simple, compact, and capable of changing a pulley diameter on which the endless rotatable device runs. When the variable drive mechanism is attached to a crankshaft of an engine, the pulley diameter may be controlled to substantially maintain a rotational speed of the endless rotatable device at an optimum speed for operating various different accessory devices. When two of the variable drive mechanisms are paired together, one being a variable drive mechanism and the other being a variable driven mechanism, the combination provides a continuously variable transmission.

The above features and advantages and other features and advantages of the present teachings are readily apparent

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a variable speed drive mechanism is generally shown at 20. The variable speed drive mechanism 20 provides a changeable pulley diameter 22 that may be varied to change a velocity or speed of an endless rotatable device 24 driven by the variable speed drive mechanism 20.

Figure 1:
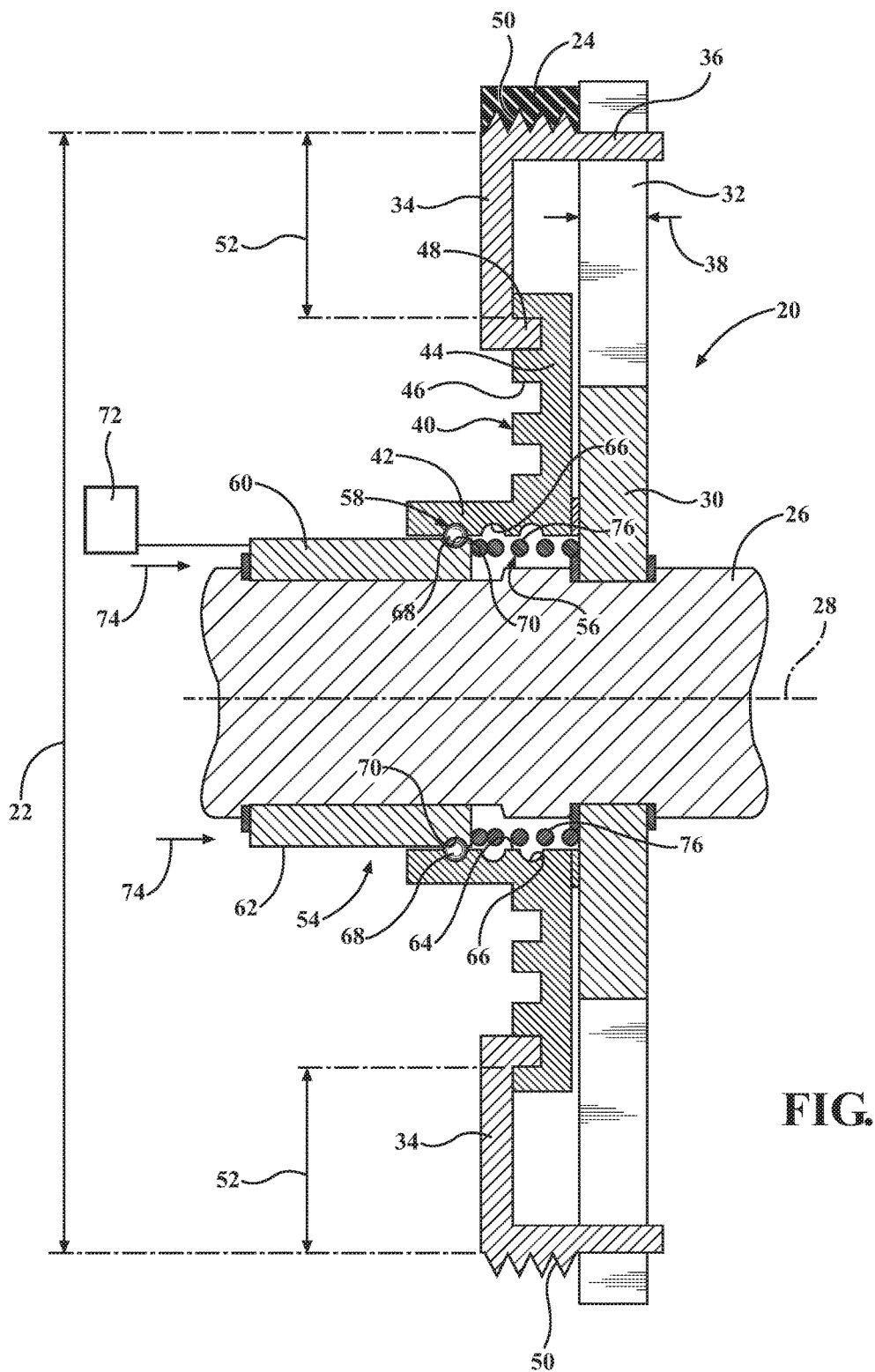
FIG. 1 is a schematic cross sectional view of a variable drive mechanism.
Figure 2:
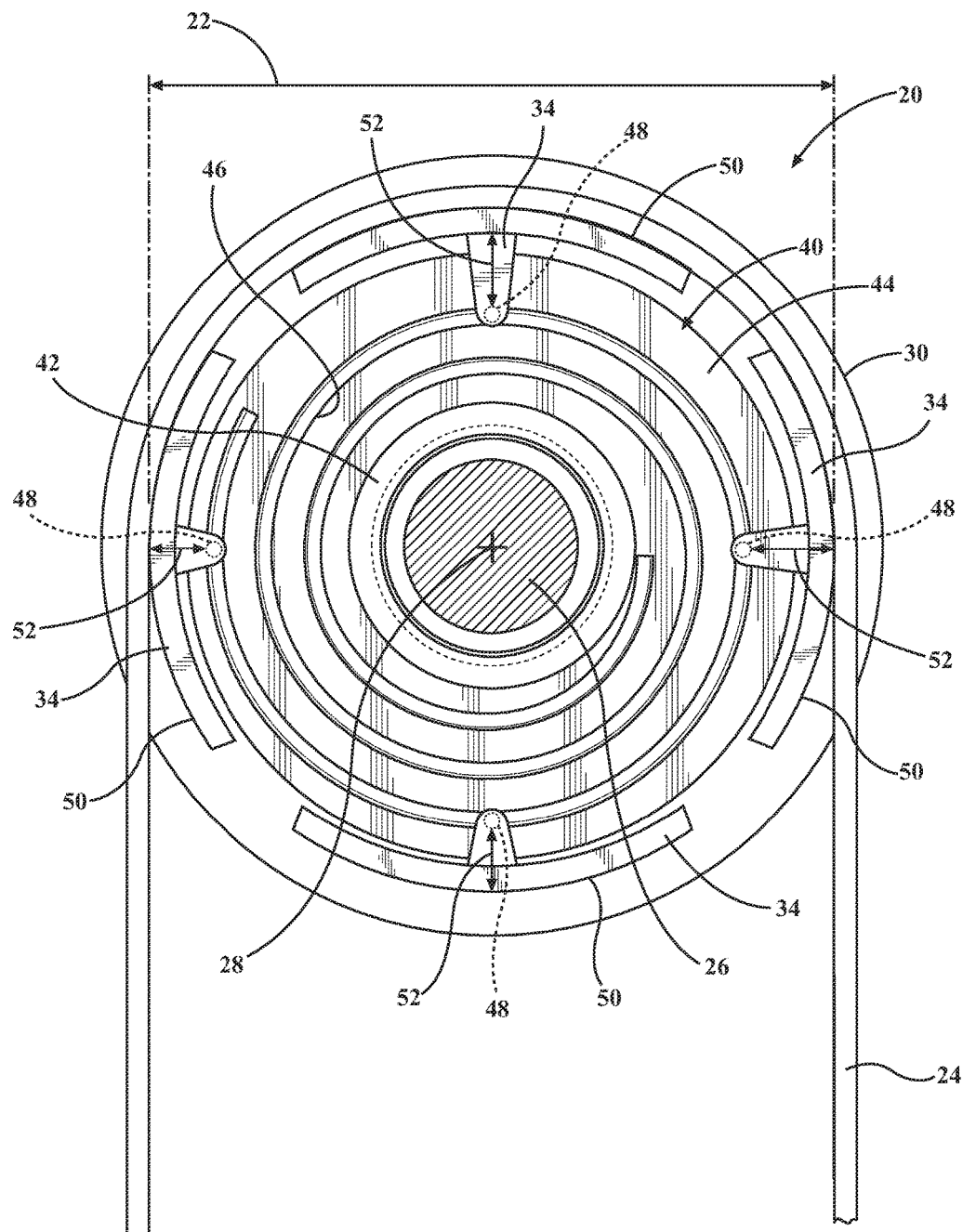
FIG. 2 is a schematic plan view from a first end of the variable drive mechanism.
Figure 3:
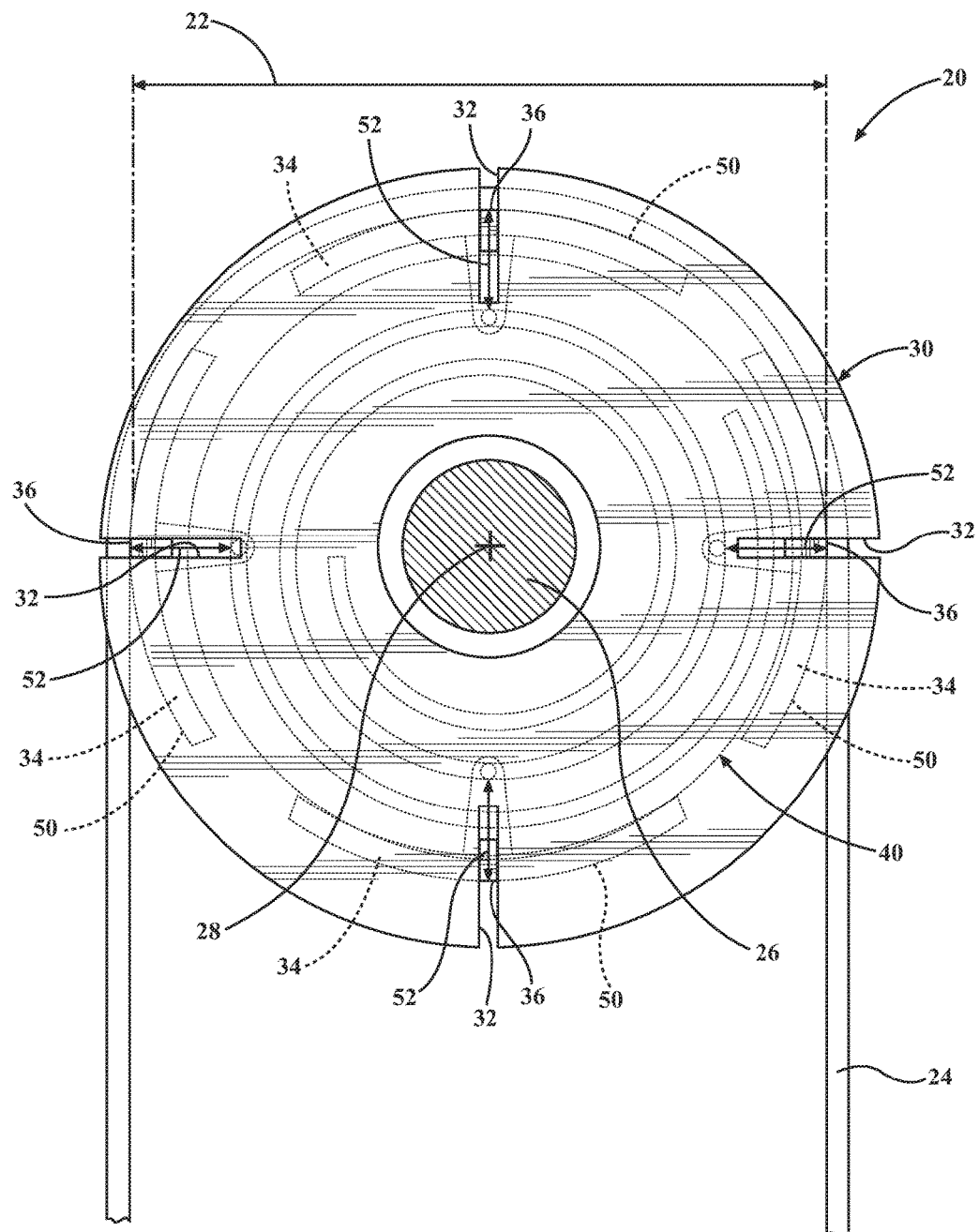
FIG. 3 is a schematic plan view from a second end of the variable drive mechanism.

Referring to FIGS. 1 through 3, the variable speed drive mechanism 20 includes a shaft 26 that extends along a central axis 28. The central axis 28 is located at the center of the shaft 26, with the shaft 26 being rotatable about the central axis 28. A fixed disk 30 is concentric with and attached to the shaft 26. The fixed disk 30 is rotatable with the shaft 26 about the central axis 28. Additionally, the shaft 26 is fixed in position along the central axis 28 relative to the shaft 26, so that the fixed disk 30 does not move along the central axis 28 relative to the shaft 26. The fixed disk 30 may be attached to the shaft 26 in any suitable manner. For example, the fixed disk 30 and the shaft 26 may be attached together by a splined connection that prevents relative rotation between the fixed disk 30 and the shaft 26. Alternatively, the fixed disk 30 may be press fit onto the shaft 26, mechanically attached to the shaft 26, or connected to the shaft 26 in some other manner, such as by welding or adhesive bonding.

As best shown in FIG. 3, the fixed disk 30 includes a plurality of slots 32. Each of the slots 32 extends radially outward relative to the central axis 28. Preferably, the slots 32 are angularly spaced from each other about the central axis 28 to define an approximately equal angle therebetween. As shown, the fixed disk 30 includes 4 slots 32 orientated at ninety degrees to each other. However, it should be appreciated that the number of slots 32 and their angular displacement relative to each other may vary from the exemplary embodiment shown in the Figures.

A plurality of pulley segments 34 is supported by the fixed disk 30. The pulley segments 34 are moveable relative to the fixed disk 30 in a radial direction relative to the central axis 28. Each of the slots 32 supports and radially guides one of the pulley segments 34. Each of the pulley segments 34 includes a guided slot portion 36 that is engaged with and moveable within a respective one of the slots 32 in the fixed disk 30. As shown, the slots 32 in the fixed disk 30 extend completely through a thickness 38 of the fixed disk 30, and the guided slot portions 36 extend completely through the fixed disk 30. However, it should be appreciated that the slots 32 and the guided slot portion 36 of the pulley segments 34 need not extend completely through the thickness 38 of the fixed disk 30. The slots 32 in the fixed disk 30 guide the guided slot portions 36 of the pulley segments 34 to direct them in radial movement relative to the central axis 28, and prevent the pulley segments 34 from rotating relative to the fixed disk 30.

Figure 4:
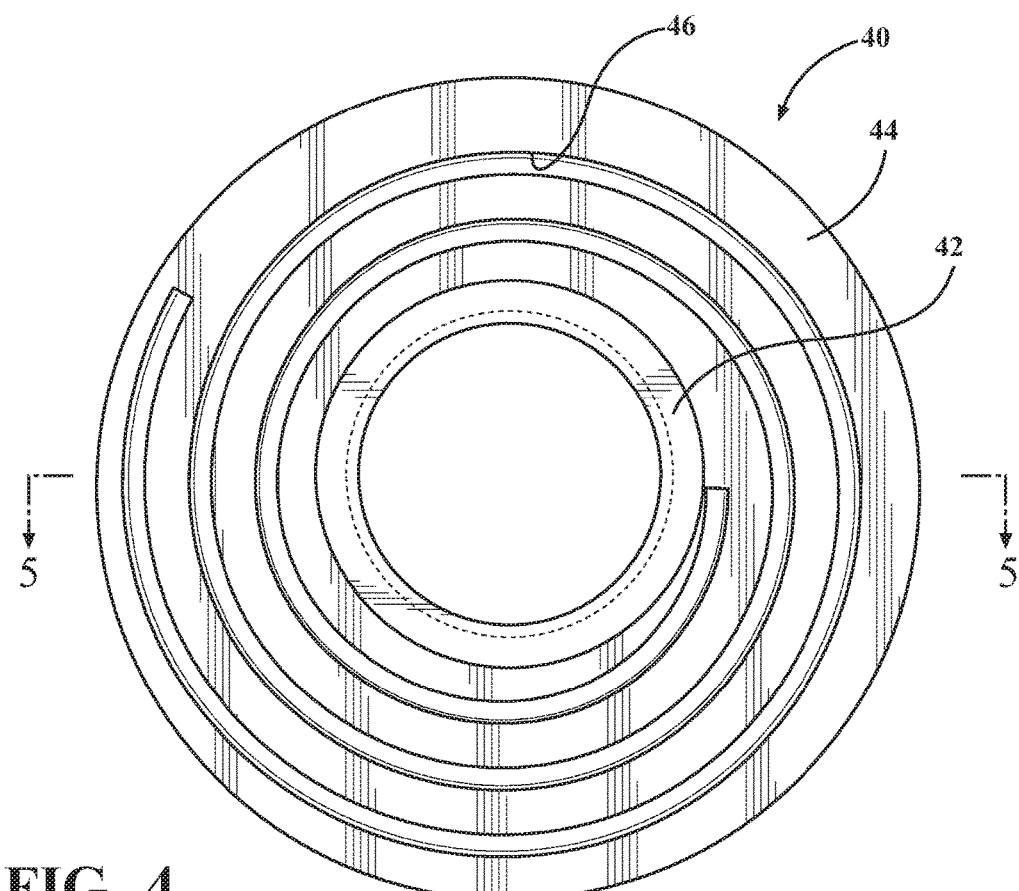
FIG. 4 is a schematic plan view of a moveable disk of the variable drive mechanism.

A moveable disk 40 is disposed concentric with the shaft 26, and is rotatably moveable about the shaft 26 relative to the fixed disk 30 and the shaft 26. The pulley segments 34 are moved within and along the slots 32 in the fixed disk 30 in response to rotation of the moveable disk 40 relative to the fixed disk 30. As best shown in FIG. 1, the moveable disk 40 includes a flange portion 44, which is attached to a ballnut 42. The ballnut 42 extends along the central axis 28, is concentric with the shaft 26, and is radially spaced from the shaft 26. The flange portion 44 and the ballnut 42 may be separate components attached together for common rotation about the central axis 28. The flange portion 44 may be fixedly attached to, and rotatable with the ballnut 42 about the central axis 28. The flange portion 44 may be attached to the ballnut 42 in any suitable manner, such as through a splined connection or some other connection that causes the flange portion 44 to rotate with the ballnut 42. Alternatively, and as shown in the Figures, the flange portion 44 and the ballnut 42 may be integrally formed as a single unit. The flange portion 44 extends radially outward from the ballnut 42, relative to the central axis 28. Referring also to FIG. 4, the flange portion 44 of the moveable disk 40 defines a spiral groove 46 having a center concentric with the shaft 26 on the central axis 28. As used herein, the term "spiral" is defined as a curve disposed on a plane that is generated by a point moving around a fixed point (a point on the central axis 28) while constantly receding from or approaching it. Accordingly, the spiral groove 46 is a groove formed into a planar surface of the moveable disk 40 that extends radially, i.e., perpendicularly, from the central axis 28.

Referring to FIG. 1, each of the pulley segments 34 includes a guided groove portion 48 that is engaged with and moveable along the spiral groove 46. Rotation of the moveable disk 40 about the shaft 26 and relative to the fixed disk 30 rotates the spiral groove 46 about the central axis 28 relative to the plurality of pulley segments 34. Rotation of the moveable disk 40 relative to the fixed disk 30 moves the guided groove portions 48 of the plurality of pulley segments 34 along the spiral groove 46, which in turn moves the pulley segments 34 radially inward or outward relative to the central axis 28. It should be appreciated that if the moveable disk 40 is rotating in a first rotational direction, e.g., a clockwise direction, then the pulley segments 34 will either move radially inward or radially outward, depending upon the specific orientation of the spiral groove 46. If the moveable disk 40 rotates in an opposite direction, e.g., a counterclockwise direction, then the pulley segments 34 move in the opposite radial direction. Accordingly, the pulley segments 34 may be moved radially inward by rotating the moveable disk 40 in a first rotational direction, and may be moved radially outward by rotating the moveable disk 40 in a second, opposite rotational direction.

Referring to FIGS. 1 through 3, each of the pulley segments 34 includes an outer circumferential surface 50. The outer circumferential surface 50 of each of the pulley segments 34 cooperate to define a substantially circular circumferential surface, defining the pulley diameter 22, shown in FIGS. 2 and 3. It should be appreciated that as the pulley segments 34 move radially inward or radially outward, the pulley diameter 22 decreases or increases respectively. The circular circumferential surface defined by the pulley segments 34 provides a contact surface for engaging the endless rotatable device 24, e.g., a belt or a chain. As shown in the Figures, the outer circumferential surface 50 of the pulley segments 34 defines a plurality of V-grooves for engaging a belt having corresponding grooves. As the pulley diameter 22 increases or decreases, the velocity of the endless rotatable device 24 increases or decreases respectively. Accordingly, by changing the radial position of the pulley segments 34, thereby changing the pulley diameter 22, the velocity of the endless rotatable device 24 may be controlled.

The outer circumferential surface 50 of each of the pulley segments 34 is radially spaced from the guided groove portion 48 a respective radial distance 52. As noted above, the guided groove portion 48 rides and moves along the spiral groove 46. Additionally, it should be appreciated that the distance from the spiral groove 46 to the central axis 28 is not constant, and is continuously changing with movement along the spiral groove 46. Furthermore, because the outer circumferential surfaces 50 of the pulley segments 34 cooperate to define the circular circumferential surface having a center located on the central axis 28, the distance from the circular circumferential surface to the spiral groove 46 varies. Accordingly, the respective radial distance 52 of each of the pulley segments 34 is different from the respective radial distance 52 of all of the other pulley segments 34. The respective radial distance 52 of each of the pulley segments 34 is sized so that the outer circumferential surface 50 of the pulley segments 34 substantially defines the circular, i.e., annular, surface that is concentric with the shaft 26.

Referring to FIG. 1, the variable speed drive mechanism 20 further includes a drive actuator 54 that is coupled to the moveable disk 40. The drive actuator 54 is operable to rotate the moveable disk 40 relative to the fixed disk 30. A biasing device 56 is coupled to the drive actuator 54, and is operable to bias the drive actuator 54 into a default position, such as shown in FIG. 1. As shown in the Figures, the drive actuator 54 includes a ball-screw mechanism 58 interconnecting the shaft 26 and the moveable disk 40. However, it should be appreciated that the drive actuator 54 may include some other type and/or configuration of actuator that is capable of rotating the moveable disk 40 relative to the fixed disk 30.

The ball-screw mechanism 58 is operable to convert linear movement directed along the central axis 28, into rotational movement of the moveable disk 40 about the central axis 28 and relative to the fixed disk 30. The ball-screw mechanism 58 includes a drive portion 60 that is disposed concentric with and attached to the shaft 26. The drive portion 60 is rotatable with the shaft 26 about the central axis 28, and is slideably moveable over the shaft 26 along the central axis 28 and relative to the moveable disk 40. The drive portion 60 may be attached to the shaft 26 in any suitable manner. For example, the drive portion 60 may be attached to the shaft 26 via a splined connection that prevents rotation of the drive portion 60 relative to the shaft 26, but allows linear movement of the drive portion 60 relative to the shaft 26, along the central axis 28.

Figure 5:
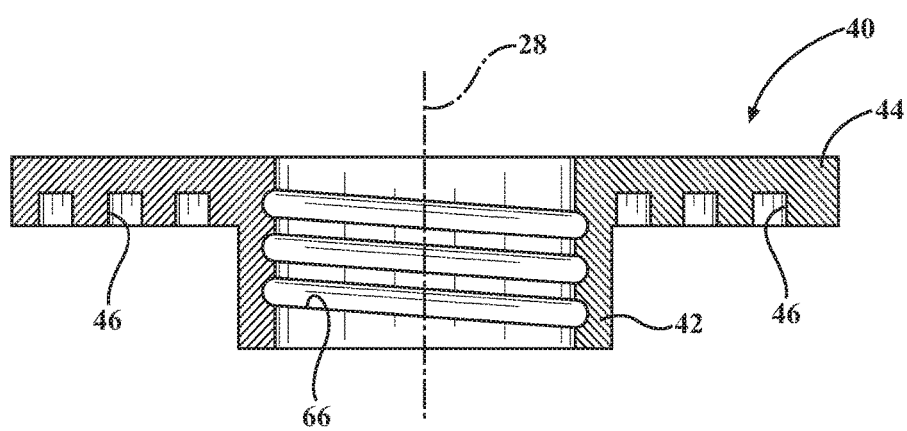
FIG. 5 is a schematic cross sectional view of the moveable disk along cut line 5-5 shown in FIG. 4.

As described above, the moveable disk 40 includes or is attached to the ballnut 42, which extends along the central axis 28, is concentric with the shaft 26, and is radially spaced from the shaft 26. As shown, the ballnut 42 is disposed radially outward of and about an outer radial surface 62 of the drive portion 60. As best shown in FIGS. 1 and 5, a radially inner surface 64 of the ballnut 42 defines a helical groove 66 having a center concentric with the shaft 26 on the central axis 28. As used herein, the term "helical" is defined as a curve that lies on a cylinder, at a constant angle to the line segments making up the surface of the cylinder, such as the curve of a screw thread. Accordingly, all locations on the helical groove 66 define a constant radial distance measured perpendicular to the central axis 28, such that the helical groove 66 does not move inward toward or outward away from the central axis 28.

Referring to FIG. 1, the ball-screw mechanism 58 includes at least one, and preferably a plurality, of balls 68 that are supported by the drive portion 60 in a respective pocket 70. The balls 68 are engaged with and moveable along the helical groove 66 of the ballnut 42. Linear movement of the drive portion 60 along the central axis 28 moves the balls 68 along the helical groove 66 of the ballnut 42. However, because the drive portion 60 is not free to rotate relative to the shaft 26, the ballnut 42 and the moveable disk 40 must rotate relative to the drive portion 60. As such, the linear movement of the drive portion 60 along the central axis 28 rotates the ballnut 42 and the moveable disk 40 relative to the drive portion 60 and the fixed disk 30. As described above, rotation of the moveable disk 40 relative to the fixed disk 30 causes the pulley segments 34 to move radially inward or outward relative to the central axis 28. Accordingly, linear movement of the drive portion 60 in a first linear direction causes the pulley segments 34 to move radially inward toward the central axis 28, and linear movement of the drive portion 60 in a second linear direction, opposite the first linear direction, causes the pulley segments 34 to move radially outward away from the central axis 28. The ball-screw mechanism 58 may include a return (not shown) that cycles the balls 68 between a first axial end of the helical groove 66 and a second axial end of the helical groove 66, as is known in the art. The return defines a path through which the balls 68 travel. As is known, as one of the balls 68 cycles through the helical groove 66 and exits the helical groove 66 at one of the axial ends of the helical groove, the ball 68 may be returned to the opposite axial end of the helical groove 66, through the path defined by the return, and re-introduced into the helical groove 66.

Referring to FIG. 1, the ball-screw mechanism 58 includes a force provider 72 that is coupled to the drive portion 60. The force provider 72 is operable to apply a force 74 to the drive portion 60, to move the drive portion 60 linearly along the central axis 28. The force provider 72 may include any suitable device capable of moving the drive portion 60 along the central axis 28, at least toward, and possibly away from the fixed disk 30. For example, the force provider 72 may include a linear actuator powered by an electric motor, a hydraulic or pneumatic force, or some other similar device.

As described above, the biasing device 56 is coupled to the drive portion 60 and is operable to bias the drive portion 60 into the default position. Accordingly, the force provider 72 must only be capable of moving the drive portion 60 in one direction, because the biasing device 56 may be configured to move the drive portion 60 in the opposite direction. As shown in FIG. 1, the biasing device 56 includes a coil spring 76 disposed concentric with the shaft 26, between the drive portion 60 and the fixed disk 30. As the drive portion 60 is moved toward the fixed disk 30 by the force provider 72, the coil spring 76 is compressed. Upon the force provider 72 releasing the force applied to the drive portion 60, the biasing device 56, e.g., the coil spring 76, may bias the drive portion 60 in the opposite direction, back to the default position.

Figure 6:
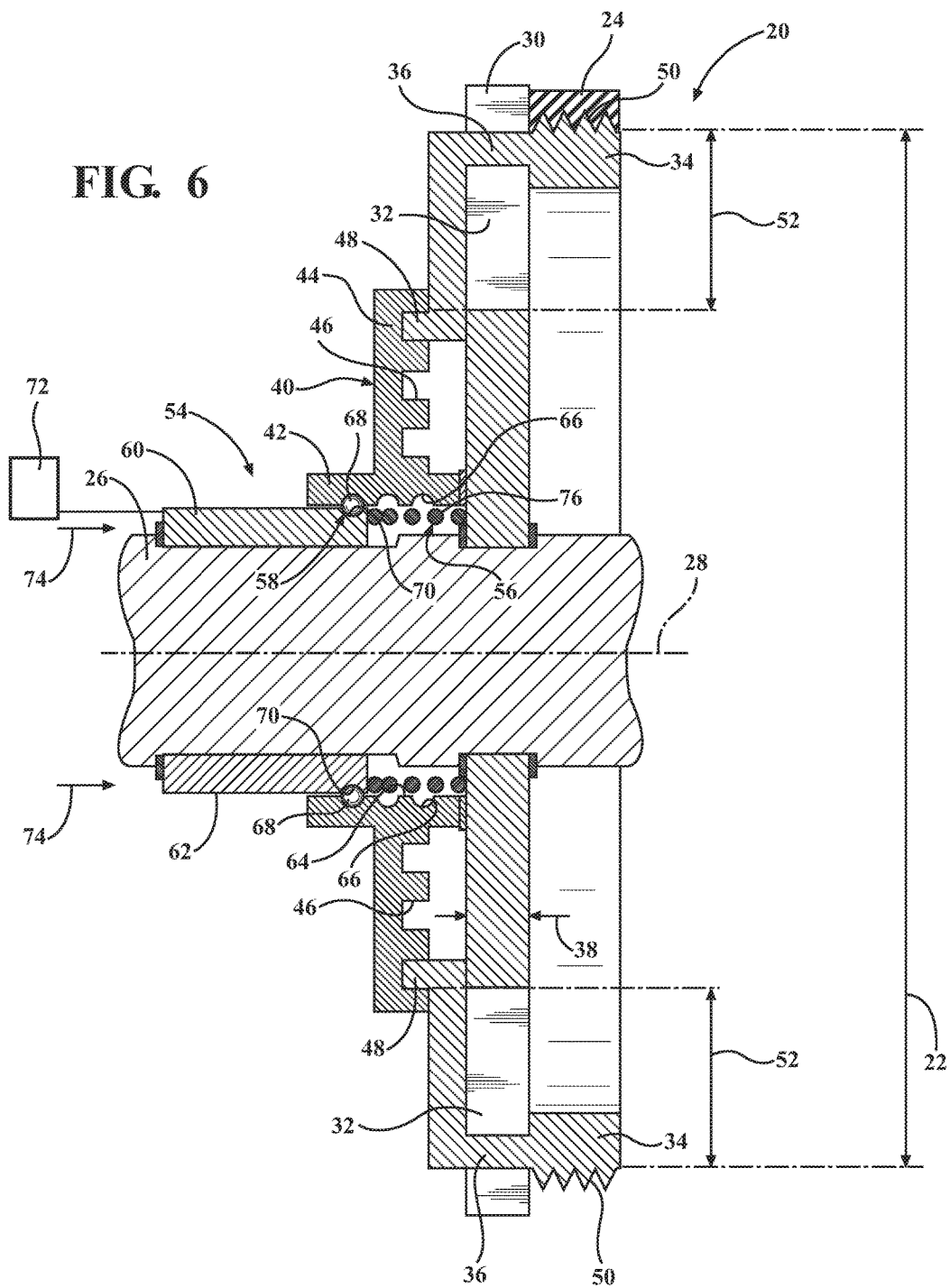
FIG. 6 is a schematic cross sectional view of an alternative embodiment of the variable drive mechanism.

Referring to FIG. 6, an alternative embodiment of the variable speed drive mechanism 20 is shown. The alternative embodiment of the variable speed drive mechanism 20 includes the same reference numerals to identify the same features, as shown in the embodiment of the variable speed drive mechanism 20 shown in FIGS. 1 through 5. The embodiment of the variable speed drive mechanism 20 shown in FIG. 6 operates in the same manner as the embodiment of the variable speed drive mechanism 20 shown in FIGS. 1 through 5. As such, the operation will not be described again. The only difference between the embodiment of the variable speed drive mechanism 20 shown in FIG. 6 and the embodiment of the variable speed drive mechanism 20 shown in FIGS. 1 through 5 is in the relative positioning of the features. As shown in FIG. 6, the spiral groove 46 is positioned in opposition to and facing the fixed disk 30, and the outer circumferential surface 50 of the pulley segments 34 is disposed adjacent an opposing side of the fixed disk 30. It should be appreciated that the configuration of the variable speed drive mechanism 20 may differ from the exemplary embodiments shown and described herein.

Figure 7:
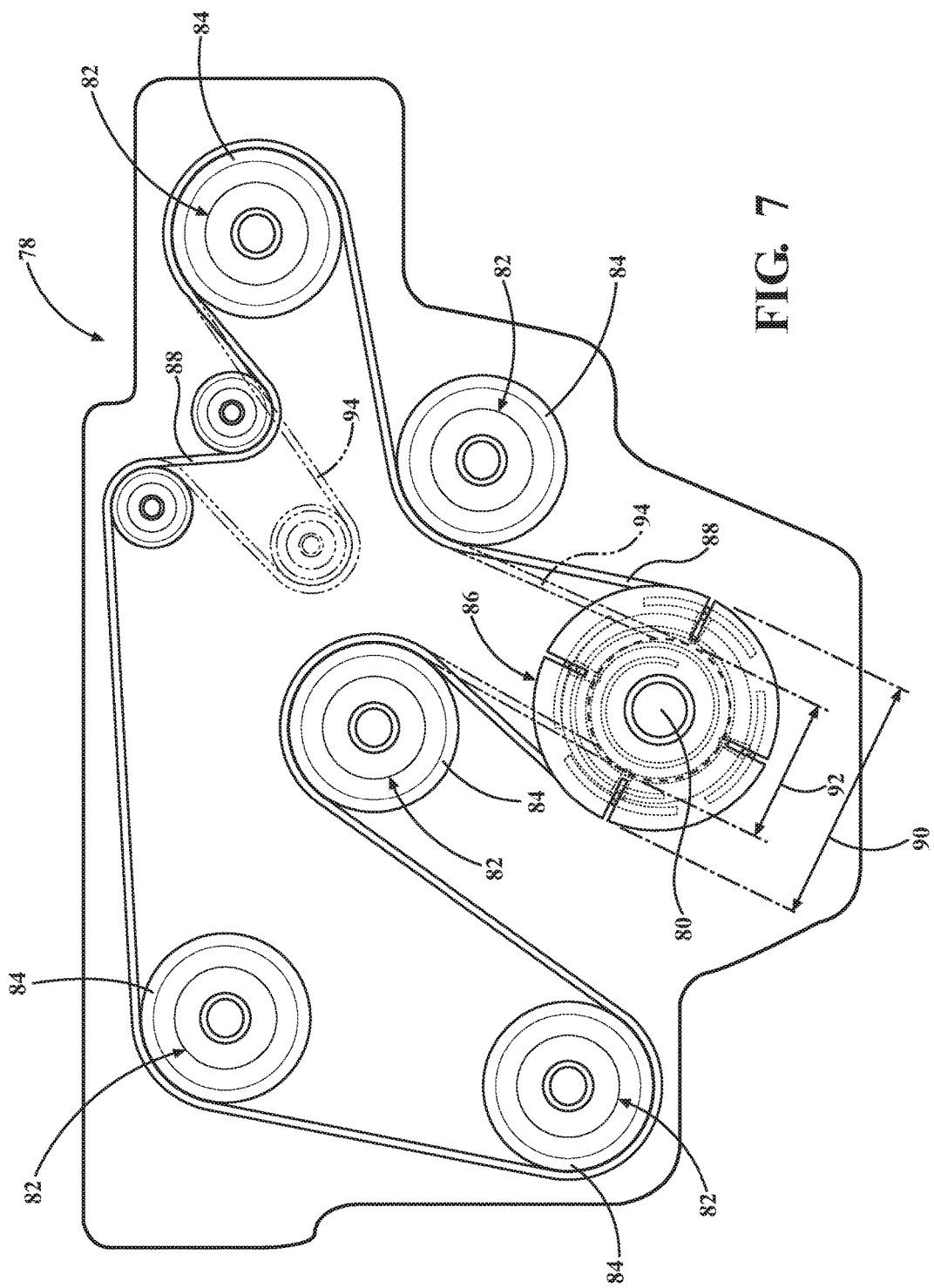
FIG. 7 is a schematic plan view from an end of an engine including the variable drive mechanism.

Referring to FIG. 7, the variable speed drive mechanism 20 is shown incorporated into an engine 78 of a vehicle. The engine 78 includes a crankshaft 80 that is caused to rotate as is known by those skilled in the art. The variable speed drive mechanism 20 is coupled to the crankshaft 80, such that rotation of the crankshaft 80 rotates the variable speed drive mechanism 20.

The engine 78 includes at least one, and typically a plurality of accessory devices 82. The accessory devices 82 may include, for example, an air conditioning compressor, a power steering pump, an air pump, an alternator, a super charger, an electric motor, or some other device that is driven by a rotational input. Each of the accessory devices 82 includes an accessory pulley 84. The endless rotatable device 24 interconnects the variable speed drive mechanism 20 and the accessory pulley 84 of the accessory device 82. The endless rotatable device 24 is operable to transmit rotation and/or torque from the variable speed drive mechanism 20 to the accessory pulleys 84. As noted above, the endless rotatable device 24 may include, but is not limited to, a belt, e.g., a serpentine belt such as shown, a chain, or some other similar device.

An adjustable tensioner 86 biases against the endless rotatable device 24. The adjustable tensioner 86 is operable to maintain a constant tension in the endless rotatable device 24. Accordingly, as the variable speed drive mechanism 20 is adjusted to change the pulley diameter 22 defined by the plurality of pulley segments 34 of the variable speed drive mechanism 20, the adjustable tensioner 86 automatically takes up the slack in the endless rotatable device 24 to maintain the proper tension. As shown in FIG. 7, the endless rotatable device 24 is shown in a first position 88 as a solid line. In order to position the endless rotatable device 24 in the first position 88, the variable speed drive mechanism 20 is adjusted to define a first larger pulley diameter 90. If the variable speed drive mechanism 20 is adjusted to define a second, smaller pulley diameter 92, then the endless rotatable device 24 shifts to a second position 94, shown by a dashed line in FIG. 7. Moving the endless rotatable device 24 into the second position 94, introduces slack into the endless rotatable device 24, which the adjustable tensioner 86 takes up, as is shown by the alternate location of the adjustable tensioner 86 shown in a dashed line in FIG. 7. Because of the larger pulley diameter 90 of the first position 88, the endless rotatable device 24 will move faster for a given rotational speed of the shaft 26, then for the smaller pulley diameter 92 for the second position 94.

Because the shaft 26 of the variable speed drive mechanism 20 is directly coupled to the crankshaft 80 of the engine 78, the shaft 26 rotates once for every rotation of the crankshaft 80, regardless of the speed at which the crankshaft 80 is rotating. Accordingly, as the rotational speed of the crankshaft 80 increases, the rotational speed of the shaft 26 increases in the same amount. The accessory devices 82 are typically designed for optimum and/or full operation when the engine 78 is operating at an idle speed. Operating the accessory devices 82 at increased speeds does not improve the operation of the accessory devices 82, and increases energy losses and/or inefficiencies associated with the accessory devices 82. As such, the variable speed drive mechanism 20 may be adjusted to define different pulley diameters 22, e.g., the larger pulley diameter 90 or the smaller pulley diameter 92, to change the speed of the endless rotatable device 24 and keep the rotational speed of the accessory devices 82 at or near an optimum level, thereby reducing the energy losses associated with operating the accessory devices 82 at higher rotational speeds.

Figure 8:
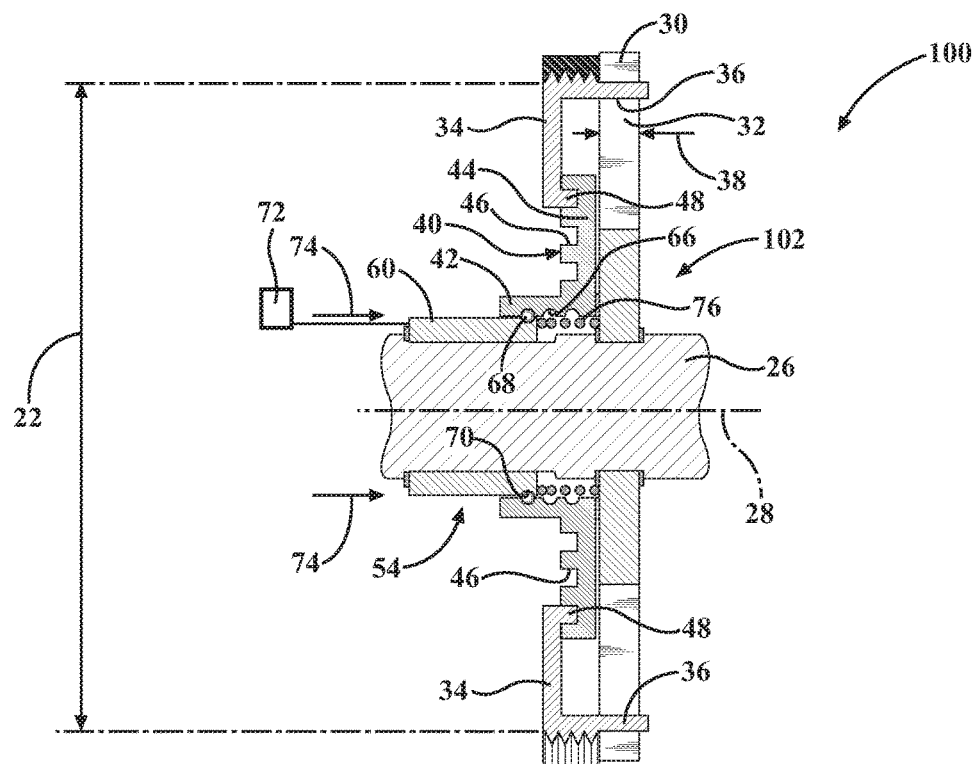
FIG. 8 is a schematic cross sectional view of a continuously variable transmission.
Figure 8:
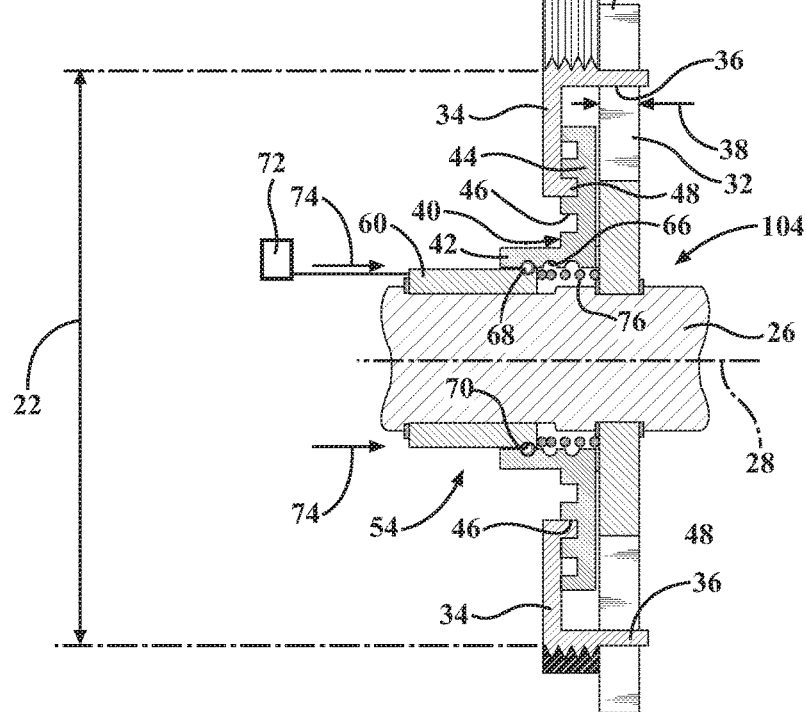

Referring to FIG. 8, a continuously variable transmission 100 is shown comprised by a pair of the variable speed drive mechanisms 20 described above. The continuously variable transmission 100 includes a variable drive mechanism 102 and a variable driven mechanism 104. The endless rotatable device 24 interconnects the variable drive mechanism 102 and the variable driven mechanism 104. The endless rotatable device 24 is operable to transmit torque from the variable drive mechanism 102 to the variable driven mechanism 104. Each of the variable drive mechanism 102 and the variable driven mechanism 104 includes the variable speed drive mechanism 20 described above. As such, the specific operation and components of the variable drive mechanism 102 and the variable driven mechanism 104 will not be described in detail again.

The continuously variable transmission 100 changes seamlessly through an infinite number of effective gear ratios, between maximum and minimum values. The gear ratio is changed by increasing the pulley diameter 22 of one of the variable drive mechanism 102 and the variable driven mechanism 104, while simultaneously decreasing the pulley diameter 22 of the other of the variable drive mechanism 102 or the variable driven mechanism 104. The distance between the variable drive mechanism 102 and the variable driven mechanism 104 does not change, and neither does the length of the endless rotatable device 24, so changing the gear ratio means both the variable drive mechanism 102 and the variable driven mechanism 104 must be adjusted (one bigger, the other smaller) simultaneously in order to maintain the proper amount of tension on the belt.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A variable speed drive mechanism comprising:
a shaft extending along a central axis;
a fixed disk concentric with and attached to the shaft, and rotatable with the shaft about the central axis;
a plurality of pulley segments supported by the fixed disk and moveable relative to the fixed disk in a radial direction relative to the central axis;
a moveable disk concentric with the shaft and rotatably moveable about the shaft relative to the fixed disk, wherein the moveable disk defines a spiral groove having a center concentric with the shaft on the central axis;
wherein each of the plurality of pulley segments includes a guided groove portion engaged with and moveable along the spiral groove, such that rotation of the moveable disk about the shaft and relative to the fixed disk rotates the spiral groove about the central axis relative to the plurality of pulley segments, thereby moving the guided groove portion of each of the plurality of pulley segments along the spiral groove to move each of the plurality of pulley segments radially relative to the central axis;
a drive actuator coupled to the moveable disk and operable to rotate the moveable disk relative to the fixed disk, wherein the drive actuator includes:
a ball-screw mechanism interconnecting the shaft and the moveable disk, wherein the ball-screw mechanism is operable to convert linear movement directed along the central axis into rotational movement of the moveable disk about the central axis and relative to the fixed disk;
wherein the ball-screw mechanism includes a drive portion concentric with and attached to the shaft, rotatable with the shaft about the central axis, and slideably moveable over the shaft along the central axis and relative to the moveable disk; and
wherein the ball-screw mechanism includes a ballnut extending along the central axis, concentric with the shaft, and radially spaced from the shaft, wherein the ballnut is fixedly attached to and rotatable with the moveable disk, and wherein a radially inner surface of the ballnut defines a helical groove having a center concentric with the shaft on the central axis.

2. The variable speed drive mechanism set forth in claim 1 wherein the fixed disc includes a plurality of slots, with each of the plurality of slots extending radially outward relative to the central axis, and wherein each of the plurality of slots supports one of the plurality of pulley segments.

3. The variable speed drive mechanism set forth in claim 2 wherein each of the plurality of pulley segments includes a guided slot portion engaged with and moveable within a respective one of the plurality of slots in the fixed disk in response to rotation of the moveable disk relative to the fixed disk.

4. The variable speed drive mechanism set forth in claim 1 wherein each of the plurality of pulley segments includes an outer circumferential surface radially spaced from the guided groove portion a respective radial distance.

5. The variable speed drive mechanism set forth in claim 4 wherein the respective radial distance of each of the plurality of pulley segments is different from the respective radial distance of all of the other pulley segments.

6. The variable speed drive mechanism set forth in claim 5 wherein the respective radial distance of each of the plurality of pulley segments is sized so that the outer circumferential surface of the plurality of pulley segments substantially defines an annular surface concentric with the shaft when the guided groove portions of the plurality of pulley segments are engaged with the spiral groove.

7. The variable speed drive mechanism set forth in claim 1 wherein the ball-screw mechanism includes at least one ball supported by the drive portion and engaged with and moveable along the helical groove of the ballnut, such that linear movement of the drive portion along the central axis moves the at least one ball along the helical groove of the ballnut, thereby rotating the ballnut and the moveable disk relative to the fixed disk.

8. The variable speed drive mechanism set forth in claim 7 wherein the ball-screw mechanism includes a force provider coupled to the drive portion and operable to apply a force to the drive portion to move the drive portion linearly along the central axis.

9. The variable speed drive mechanism set forth in claim 1 further comprising a biasing device coupled to the drive actuator and operable to bias the drive actuator into a default position.

10. An engine for a vehicle, the engine comprising:
an accessory device having an accessory pulley;
a crankshaft;
a variable speed drive mechanism coupled to the crankshaft;
an endless rotatable device interconnecting the variable speed drive mechanism and the accessory pulley of the accessory device, and operable to transmit rotation therebetween;
an adjustable tensioner biasing against the endless rotatable device and operable to maintain a constant tension in the endless rotatable device;
wherein the variable speed drive mechanism includes:
a shaft coupled to the crankshaft for rotation with the crankshaft about a central axis;
a fixed disk concentric with and attached to the shaft, and rotatable with the shaft about the central axis;
a plurality of pulley segments supported by the fixed disk and moveable relative to the fixed disk in a radial direction relative to the central axis;
a moveable disk concentric with the shaft and rotatably moveable about the shaft relative to the fixed disk, wherein the moveable disk defines a spiral groove having a center concentric with the shaft on the central axis;
wherein each of the plurality of pulley segments includes a guided groove portion engaged with and moveable along the spiral groove, such that rotation of the moveable disk about the shaft and relative to the fixed disk rotates the spiral groove about the central axis relative to the plurality of pulley segments, thereby moving the guided groove portion of each of the plurality of pulley segments along the spiral groove to move each of the plurality of pulley segments radially relative to the central axis;
a drive actuator coupled to the moveable disk and operable to rotate the moveable disk relative to the fixed disk;
wherein the fixed disc includes a plurality of slots, with each of the plurality of slots extending radially outward relative to the central axis, and wherein each of the plurality of pulley segments includes a guided slot portion engaged with and moveable within a respective one of the plurality of slots in the fixed disk in response to rotation of the moveable disk relative to the fixed disk;

wherein the drive actuator includes a ball-screw mechanism interconnecting the shaft and the moveable disk, wherein the ball-screw mechanism is operable to convert linear movement directed along the central axis into rotational movement of the moveable disk about the central axis and relative to the fixed disk;

wherein the ball-screw mechanism includes a ballnut extending along the central axis, concentric with the shaft, and radially spaced from the shaft, wherein the ballnut is fixedly attached to and rotatable with the moveable disk, and wherein a radially inner surface of the ballnut defines a helical groove having a center concentric with the shaft on the central axis;

wherein the ball screw mechanism includes a drive portion concentric with and attached to the shaft, rotatable with the shaft about the central axis, and slideably moveable over the shaft along the central axis and relative to the ballnut and the moveable disk; and wherein the ball screw mechanism includes at least one ball supported by the drive portion and engaged with and moveable along the helical groove of the ballnut, such that linear movement of the drive portion along the central axis moves the at least one ball along the helical groove of the ballnut, thereby rotating the ballnut and the moveable disk relative to the fixed disk.

11. The engine set forth in claim 10 further comprising a coil spring concentric with the shaft and disposed between the drive portion and the fixed disk, wherein the coil spring is operable to bias the drive portion into a default position.

12. A continuously speed drive mechanism comprising:
a shaft extending along a central axis;
a fixed disk concentric with and attached to the shaft, and rotatable with the shaft about the central axis;
a plurality of pulley segments supported by the fixed disk and moveable relative to the fixed disk in a radial direction relative to the central axis;
a moveable disk concentric with the shaft and rotatably moveable about the shaft relative to the fixed disk, wherein the moveable disk defines a spiral groove having a center concentric with the shaft on the central axis;
wherein each of the plurality of pulley segments includes a guided groove portion engaged with and moveable along the spiral groove;
a ball-screw mechanism interconnecting the shaft and the moveable disk;
wherein the ball-screw mechanism includes a drive portion concentric with and attached to the shaft, rotatable with the shaft about the central axis, and slideably moveable over the shaft along the central axis and relative to the moveable disk; and wherein the ball-screw mechanism includes a ballnut extending along the central axis, concentric with the shaft, and radially spaced from the shaft, wherein the ballnut is fixedly attached to and rotatable with the moveable disk, and wherein a radially inner surface of the ballnut defines a helical groove having a center concentric with the shaft on the central axis.

13. The variable speed drive mechanism set forth in claim 12 wherein the ball-screw mechanism includes at least one ball supported by the drive portion and engaged with and moveable along the helical groove of the ballnut, such that linear movement of the drive portion along the central axis moves the at least one ball along the helical groove of the ballnut, thereby rotating the ballnut and the moveable disk relative to the fixed disk.

14. The variable speed drive mechanism set forth in claim 12 wherein the ball-screw mechanism includes a force provider coupled to the drive portion and operable to apply a force to the drive portion to move the drive portion linearly along the central axis.

15. The variable speed drive mechanism set forth in claim 12 further comprising a biasing device coupled to the drive portion and operable to bias the drive portion into a default position.

16. The variable speed drive mechanism set forth in claim 12 wherein the fixed disc includes a plurality of slots, with each of the plurality of slots extending radially outward relative to the central axis, and wherein each of the plurality of slots supports one of the plurality of pulley segments.

17. The variable speed drive mechanism set forth in claim 16 wherein each of the plurality of pulley segments includes a guided slot portion engaged with and moveable within a respective one of the plurality of slots in the fixed disk in response to rotation of the moveable disk relative to the fixed disk.

18. The variable speed drive mechanism set forth in claim 12 wherein each of the plurality of pulley segments includes an outer circumferential surface radially spaced from the guided groove portion a respective radial distance.

19. The variable speed drive mechanism set forth in claim 18 wherein the respective radial distance of each of the plurality of pulley segments is different from the respective radial distance of all of the other pulley segments.

20. The variable speed drive mechanism set forth in claim 18 wherein the respective radial distance of each of the plurality of pulley segments is sized so that the outer circumferential surface of the plurality of pulley segments substantially defines an annular surface concentric with the shaft when the guided groove portions of the plurality of pulley segments are engaged with the spiral groove.

* * * * *